(12) United States Patent
Villalba Van Dijk et al.

(10) Patent No.: US 10,976,077 B2
(45) Date of Patent: Apr. 13, 2021

(54) LINEAR FRESNEL SOLAR POWER SYSTEM THAT CAN BE TRANSPORTED IN A GOODS CONTAINER

(71) Applicant: SOLATOM CSP S.L., Madrid (ES)

(72) Inventors: Raul Villalba Van Dijk, Madrid (ES); Miguel Herraiz Frasquet, Valencia (ES)

(73) Assignee: SOLATOM CSP S.L., Madrid (ES)

( * ) Notice: Subject to any disclaimer, the term of this patent is extended or adjusted under 35 U.S.C. 154(b) by 803 days.

(21) Appl. No.: 15/326,971

(22) PCT Filed: Jul. 24, 2015

(86) PCT No.: PCT/ES2015/070573
§ 371 (c)(1),
(2) Date: Jan. 17, 2017

(87) PCT Pub. No.: WO2016/012650
PCT Pub. Date: Jan. 28, 2016

(65) Prior Publication Data
US 2017/0205118 A1 Jul. 20, 2017

(30) Foreign Application Priority Data

Jul. 25, 2014 (ES) .................... P201431121

(51) Int. Cl.
*F24S 50/20* (2018.01)
*F24S 23/77* (2018.01)
(Continued)

(52) U.S. Cl.
CPC ............... *F24S 23/77* (2018.05); *F24S 23/79* (2018.05); *F24S 30/425* (2018.05); *F24S 40/20* (2018.05);
(Continued)

(58) Field of Classification Search
CPC ............. F24S 2024/02; F24S 2023/872; F24S 2025/012; F24S 23/77; F24S 23/79;
(Continued)

(56) References Cited

U.S. PATENT DOCUMENTS 4,051,834 A    10/1977    Fletcher et al.
8,664,511 B2 *  3/2014    Swatek .................. H02S 20/30
                                                          136/244
(Continued)

FOREIGN PATENT DOCUMENTS

DE      29808939 U1    12/1998
DE    202009009020 U1    10/2009
(Continued)

Primary Examiner — Alfred Basichas
(74) Attorney, Agent, or Firm — Hayes Soloway PC

(57) ABSTRACT

A linear fresnel solar power system which is transportable in a goods container, wherein the solar power system comprises: a number of rows of reflective mirrors, and a support structure, the support structure comprising a base for assembling the support structure on a commercial goods container, and the container defining a volume, wherein the support structure further comprises: two foldable lateral platforms articulated to the base of the support structure; and two mirror-carrying banks, supported by the lateral platforms, wherein the rows of reflective mirrors are mounted on the mirror-carrying banks. The invention helps to save transportation and assembling costs.

9 Claims, 6 Drawing Sheets

(51) Int. Cl.
*F24S 80/00* (2018.01)
*F24S 30/425* (2018.01)
*F24S 23/79* (2018.01)
*F24S 40/20* (2018.01)
*F24S 25/00* (2018.01)
*F24S 23/70* (2018.01)

(52) U.S. Cl.
CPC ............... *F24S 50/20* (2018.05); *F24S 80/00* (2018.05); *F24S 2023/872* (2018.05); *F24S 2025/012* (2018.05); *Y02E 10/47* (2013.01)

(58) Field of Classification Search
CPC .......... F24S 30/425; F24S 50/20; F24S 40/20; F24S 80/00; Y02E 10/47
USPC ................................. 126/600, 624, 627, 903
See application file for complete search history.

(56) References Cited

U.S. PATENT DOCUMENTS

| | | | | |
|---|---|---|---|---|
| 2008/0230047 A1* | 9/2008 | Shugar | .................... | H02S 20/00 |
| | | | | 126/569 |
| 2010/0229852 A1* | 9/2010 | Buckley | .................. | F24S 50/20 |
| | | | | 126/652 |
| 2013/0037072 A1* | 2/2013 | Powell | ................. | H01L 31/0547 |
| | | | | 136/206 |
| 2013/0082637 A1* | 4/2013 | Eaton | .................... | F24S 30/425 |
| | | | | 320/101 |
| 2013/0285595 A1* | 10/2013 | Eaton, Jr. | .............. | H01L 31/042 |
| | | | | 320/101 |
| 2015/0013750 A1* | 1/2015 | Meppelink | .............. | H02S 30/20 |
| | | | | 136/245 |
| 2016/0352285 A1* | 12/2016 | Seery | ....................... | H02S 30/20 |
| 2018/0062572 A1* | 3/2018 | Kunesh | ................. | F24S 30/452 |

FOREIGN PATENT DOCUMENTS

| | | |
|---|---|---|
| DE | 102009031905 A1 | 1/2011 |
| ES | 2431463 | 5/2013 |
| WO | 2009004476 A2 | 1/2009 |
| WO | WO-2015073936 A1 * | 5/2015 |

* cited by examiner

LINEAR FRESNEL SOLAR POWER SYSTEM THAT CAN BE TRANSPORTED IN A GOODS CONTAINER

OBJECT OF THE INVENTION

The present invention may be included within the technical field of linear fresnel solar power systems used to produce thermal energy from solar energy concentration. Thereafter, the thermal energy generated may be used directly in any process that requires the use of a hot fluid or in electricity generation.

The transportable linear fresnel solar power system of the present invention makes it possible to build a complete solar power system on a commercial goods container at the plant, and transport it to the desired location on the same container in a simple manner. Once it has been placed at the desired location, it may be quickly assembled.

BACKGROUND OF THE INVENTION

A linear fresnel solar power system is made up of rows of flat or semi-flat mirrors placed next to one another on the same plane. These rows of mirrors have the freedom of movement to rotate around themselves, such that they may perform solar tracking, being oriented at different angles depending on the sun's position. The solar energy reflected by the mirrors hits a linear receiver located at a given height over the plane of the mirrors. The total surface area of the rows of mirrors is significantly greater than the exposed surface area of the linear receiver; consequently, solar radiation is concentrated on the receiver, to an extent equivalent to the ratio between the surface area of the mirrors and that of the linear receiver.

The solar energy concentrated on the linear receiver is transported using a heat transfer fluid (normally, pressurised water or thermal oil) that circulates throughout the receiver. In this way, the fluid absorbs solar energy, which increases its temperature and, in turn, refrigerates the receiver. The thermal energy is transported by the fluid towards the point of consumption.

At present, there is ample experience in the use of this type of solar power systems in industrial process heat applications. Testimony to that are projects which are currently in operation or under construction; to mention some of the most significant: the 750-kW solar cooling system at the Doha football stadium (Qatar) and the 175-kW facility used to condition the School of Engineering of the University of Seville (Spain). Moreover, albeit to a lesser extent, this type of systems has been used to generate electrical energy in large-size plants. One example within the Spanish territory is the 1.4-MW Puerto Errado plant (Murcia), although there are other large projects around the world, such as the 5-MW Kimberlina plant in California (USA).

Despite the existence of commercial projects in operation and the considerable interest in the market, this technology is still not as competitive as those based on fossil fuels, for which reason it is necessary to insist on the development of actions designed to reduce the cost of the energy produced.

Unfortunately, this type of systems presents certain technological barriers that limit their competitiveness and which are delaying their large-scale implementation. The technological barriers are the following:

High cost of the components: Most manufacturers of solar power industry components are located in Europe and China, whereas solar projects are located at different sites throughout the world (generally places with high solar radiation). Due to the long distances between the production sites and the sites where the projects are finally implemented, in most cases the most economical alternative is to move the manufacturing to the project site. This not only involves the direct cost of building a production plant and the necessary infrastructures to provide services for the workers, but also the search for new suppliers, training new workers or transferring already existing workers, etc. All of this entails a significant increase in the cost of the final product, which makes small-scale projects that cannot recover the cost of transferring the production unfeasible.

Deterioration of the quality of the final product: When the production is transferred to the project site, temporary production plants are built which must be disassembled once the project is completed. This makes it economically unviable to have the machinery and the instrumentation that would be available at a permanent production plant. Consequently, it is necessary to relax the quality requirements as compared to those imposed when the production is performed at a plant with all the resources available.

Long assembly time: Concentrating solar power systems are made up of a large number of elements, which are manufactured separately and assembled at the project location. This process requires highly qualified personnel and the duration is considerable, which not only entails significant assembly expenses (due to the wages of the personnel involved), but, moreover, during the assembly time the plant is still not operative and, therefore, not in production.

Very exacting start-up of the facilities: Due to the nature of concentring solar power systems, which require high precision, it is necessary to check the systems once they have been built in order to ensure the good operation thereof. The inevitable lack of precision of field assembly makes it impossible to meet the necessary precision requirements for solar pointing and tracking, such that it is necessary to perform fine-tuning tasks once the construction has been completed. This type of tasks require workers with specific training, as well as using especially designed instrumentation. All this increases the cost and delays the start-up of this type of plants, thereby considerably increasing the cost of the energy produced.

Limited re-use of the components: Due to the high cost of assembly and the fact that a large part of the facilities are not re-usable (for example, the foundations), this type of projects require long life cycles, since short periods of use would not allow far recovery of the costs generated. Consequently, only long-term projects are viable. However, in the case of a technology such as this one, which is still not too widespread, promoting long-term projects creates uncertainty and unwillingness amongst potential clients, which opt for more conventional technologies for long-term projects. Moreover, this restricts business models wherein only the energy produced is sold to the clients and the property of the system remains in the hands of the promoter, since it requires ensuring a very long-term customer loyalty.

DESCRIPTION OF THE INVENTION

The present invention overcomes the aforementioned disadvantages, by means of a transportable fresnel solar power system that comprises a number of rows of reflective mirrors, an automatic cleaning system, a linear receiver and a support structure designed to be assembled on a commercial goods container.

The transportable fresnel solar power system comprises a support structure which, in turn, comprises two foldable lateral platforms, where the rows of reflective mirrors mounted on mirror-carrying banks and the ballast tanks are placed. These foldable lateral platforms are placed in the vertical position with respect to the floor of the goods container when the collector is being transported and/or stored. When the system is deployed, the lateral platforms are folded until they are in the horizontal position on the sides of the container. During this movement, the goods container remains fixed. The mirror-carrying banks make it possible to regulate the height of the rows of mirrors, such that they may all be correctly aligned.

The automatic cleaning system comprises a number of cleaning units mounted on intermediate stiffeners which move parallel to the rows of mirrors, in both directions. These cleaning units comprise an absorbent material designed to clean by contact, a protective cover designed to prevent the absorbent material from getting dirty, and water outlet elements. The water outlet elements are preferably sprinkler branch pipes connected to the cleaning units, from which clean water is aimed at the reflective surface of the mirrors in order to clean them. The water is aimed at the mirrors vertically, from top to bottom. The absorbent material of the cleaning units goes through the row of mirrors thanks to the movement of the stiffeners. During this movement, the water outlet elements supply the necessary water to clean the mirrors.

The linear receiver comprises an insulated casing protected by a transparent cover the interior whereof has at least one tubular receiver, and through which the heat transfer fluid is made to circulate, and a secondary reflective surface used to redirect towards the receiver those reflected rays that do not hit the front side of the tubular receiver directly.

The correct position of the linear receiver is achieved by means, of end supports articulated on the structure of the goods container. When the system is being transported and/or stored, the end supports place the linear receiver inside the volume contained by the structure of the goods container, whereas, when the system is deployed, the supports are articulated until the linear receiver is placed in the operating position.

In an embodiment of the invention wherein the commercial container used is of the open-top type (ISO 22P4 "Flat Rack"), the end supports of the linear receiver are articulated on the pillars of the container and the foldable platforms are articulated by means of hinges placed on the base of the container. In this embodiment, when the system is in transport or storage, the foldable platforms are in the vertical position and contained inside the internal volume of the container. Likewise, the end supports are folded and the linear receiver also remains inside the volume of the container. In this position, the upper terminals of the pillars of the container are free, such that another container may be placed on top of it. When the system is at the project site, the foldable platforms are horizontally deployed and the linear receiver is placed in the operating position by rotating the end supports.

When the project requires a very large surface area, larger systems may be created by connecting one or more containers in series. The minimum system unit called "module" is a container.

This system presents significant improvements with respect to conventional systems, as it makes it possible to:

Reduce the cost of the components: Since the system is transportable through conventional distribution channels for transporting goods in containers, the components may be produced at a suitably equipped permanent plant and subsequently transported to the project site. Therefore, it is not necessary to incur the extra cost Involved in building a temporary production plant at the project site; instead, the production may be centralised; for example, in countries with low production costs. Moreover, the system's storage potential allows for assembly line production, which reduces the costs even further.

Improve the quality of the final product: Since all the elements are produced at the central facilities, better quality control may be carried on, since there are better resources than at temporary production plants.

Reduce the assembly time: The system is designed such that it is pre-assembled at the plant, which considerably reduces the field assembly time. Once it has been transported to the project site, it is only necessary to deploy the different components and connect the necessary number of containers. Moreover, the additional weight of the goods container and the ballast tanks make it possible to dispense with foundations, which entails an additional reduction in the field assembly time. The time saved in the assembly is a time during which the system may be in operation and, therefore, in production.

Accelerate the start-up of the facilities: Since the system is transported pre-assembled, it is possible to test it directly at the plant, thereby dispensing with costly in situ verifications, and even take some measurements that cannot be taken in the field. When the system is deployed at the project site, no structural changes are made; this ensures that the system will behave as it does at the plant. The time saved in the start-up is a time during which the system may be in operation and, therefore, in production.

Re-use the components: Since the time, and therefore the cost, of assembly are reduced to a minimum, this system makes short-term projects viable. In these cases, when the project ends, it is possible to transport the collectors to another location, thereby re-using almost all of the components. Moreover, this characteristic allows for business models such as the leasing or sale of energy services, wherein it is not necessary for the client to purchase the collector.

DESCRIPTION OF THE DRAWINGS

In order to supplement the description being made, and to contribute to a better understanding of the characteristics of the invention, according to a preferred embodiment thereof, a non-limiting set of drawings is attached to said description as an integral part thereof, where the following is represented.

PREFERRED EMBODIMENT OF THE INVENTION

With the aid of the aforementioned FIGS. 1-6, below we provide a detailed description of a possible embodiment of the invention using open-top or Flat Rack goods containers.

Figure 1:
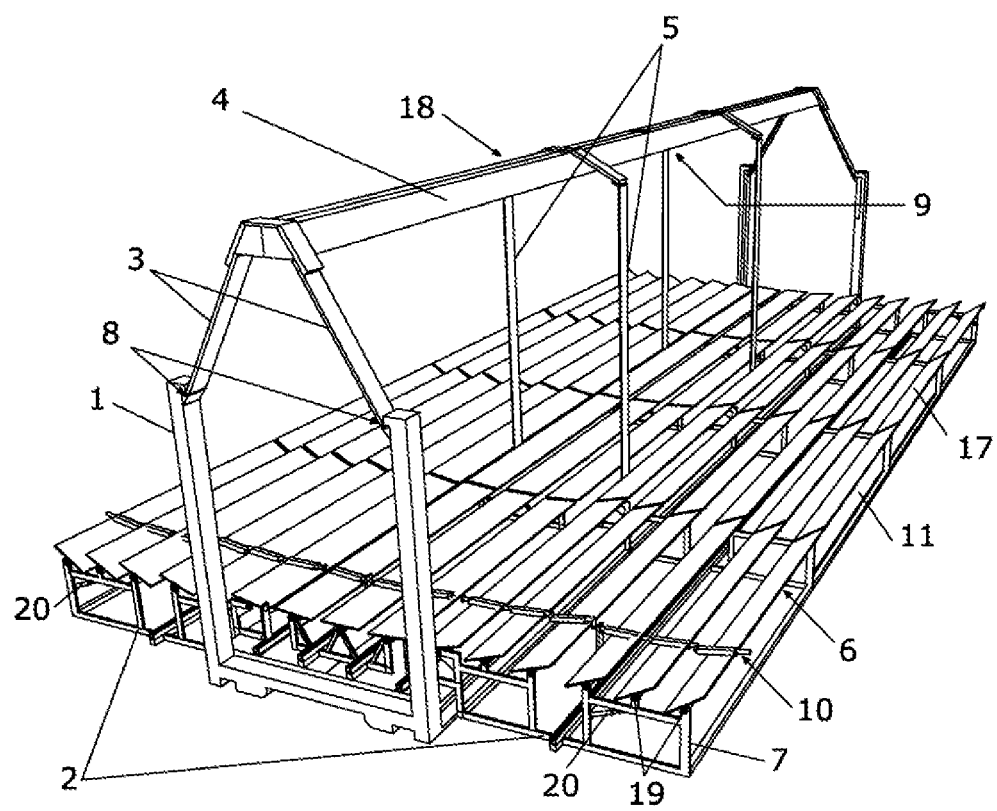
FIG. 1.—Shows a perspective view of the system, deployed at the project site and in the operating position; the figure shows the main components thereof.
Figure 2:
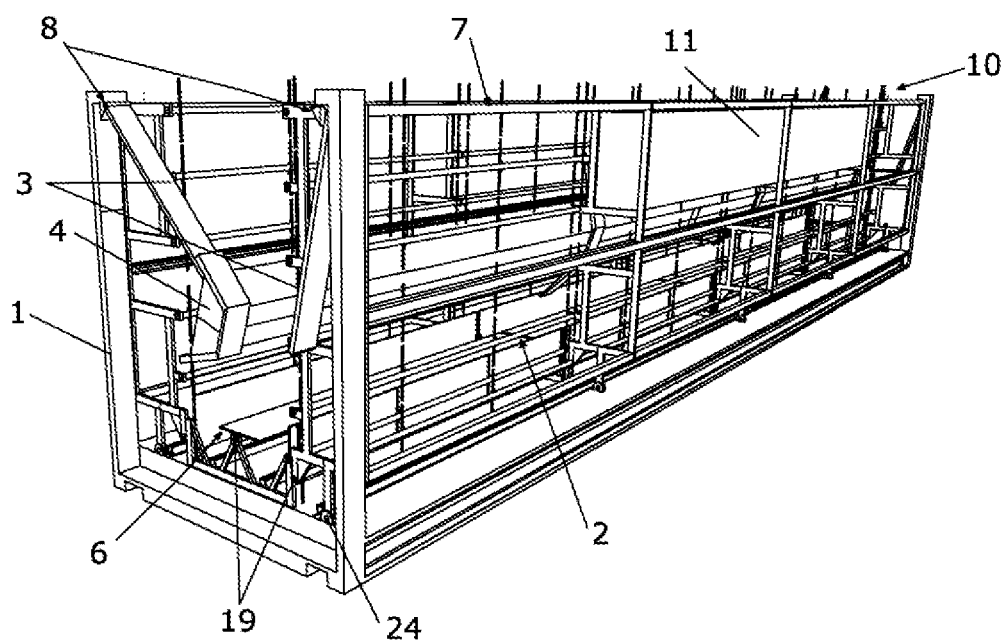
FIG. 2.—Shows a view of the system represented in FIG. 1 when it is in the transport and/or storage position and the elements are contained inside the volume of the container.
Figure 3:
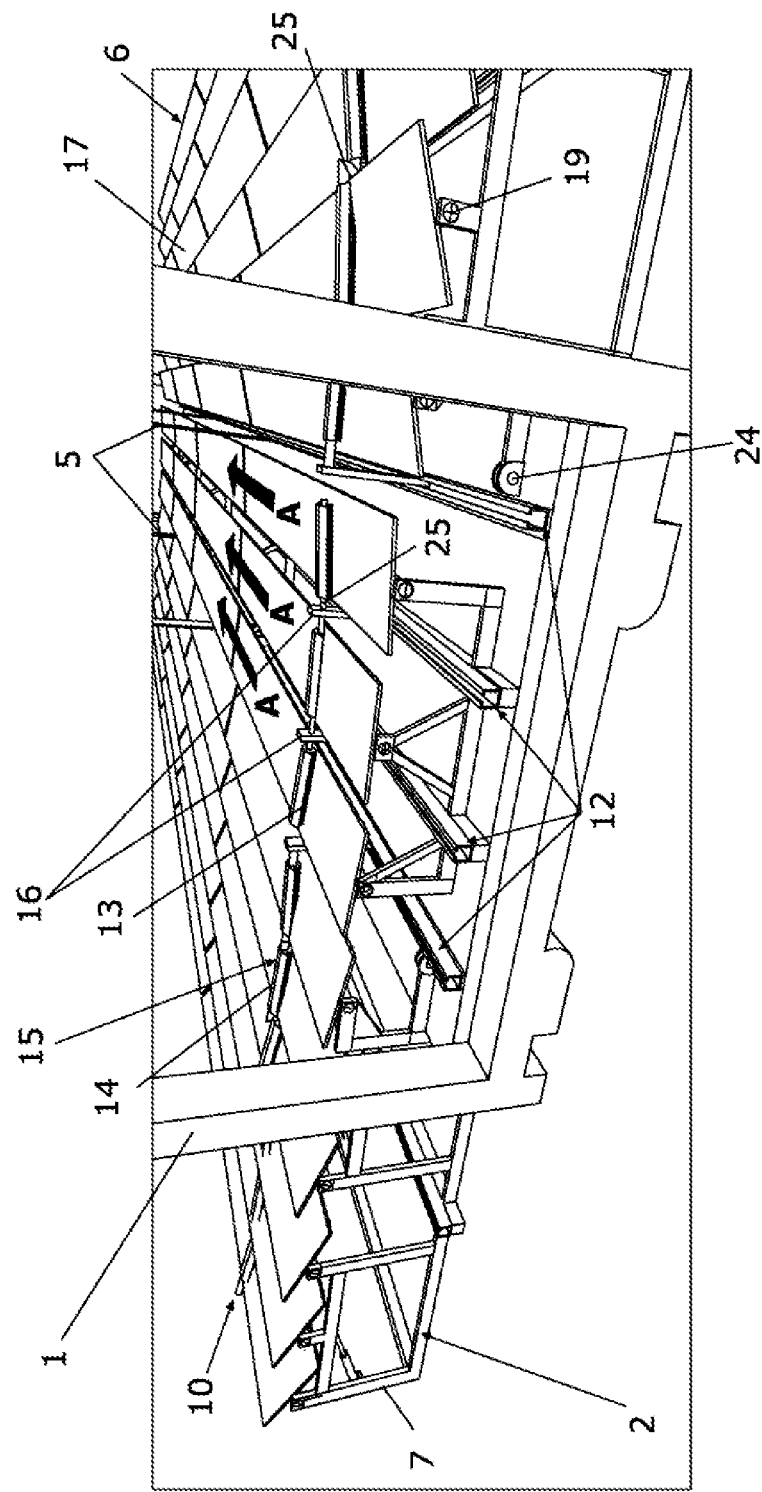
FIG. 3.—Shows a view of the system in the embodiment of FIGS. 1 and 2, and shows in detail the mirror cleaning system and the components thereof, as well as the preferred direction of travel of the system.

The linear fresnel solar power system which is transportable in a goods container comprises an open-top or Flat Rack container (1), which, in turn, is a part of the structure that supports the rest of the elements. This support structure comprises two foldable lateral platforms (2) where the rows of mirrors (6), mounted on mirror-carrying banks (7), are placed. The foldable lateral platforms (2) are placed in the horizontal position with respect to the ground when the system is in the deployed or operating position (FIG. 1), and in the vertical position, when the system is in transport and/or storage position (FIG. 2).

The foldable lateral platforms (2) comprise at least one ballast tank (11). This ballast tank (11) remains empty during transport and/or storage, and is filled with water or another fluid when the system is deployed. Once the ballast tank (11) is filled, the additional weight of the fluid incorporated into the system acts as excess weight, which makes it possible to reduce and, in some cases, avoid the use of foundations.

The movement of the foldable lateral platforms (2), from the vertical position to the horizontal position, is achieved by using hinges (24) anchored to the base of the structure of the container (1) or another system that makes folding possible.

The mirror-carrying banks (7) are composed of a given number of metallic structures, which provide the rows of mirrors (6) with support and rigidity. The height of the banks is adjusted such that the rows of mirrors (6) are installed at the designed height. The necessary number of mirror-carrying banks (7) depends on the designed rigidity of the rows of mirrors (6).

The rows of mirrors (6) comprise a given number of mirrors (17) continuously aligned to form a row. This row solidarily connects all the mirrors (17) together, such that, when the row of mirrors (6) moves, ell the mirrors (17) contained therein move. The movement of the rows of mirrors (6) is a rotating movement around the axis of the row (19). This rotating movement is achieved by means of a tracking mechanism (20) which, in a preferred embodiment, is a linear actuator.

The linear receiver (18) comprises an external casing (4), end supports (3) and intermediate supports (5). In turn, the external casing (4) comprises a transparent cover (23), insulating means (21), a secondary reflective surface (22) and at least one tubular receiver (9).

The external casing (4) creates a hollow cavity which houses the tubular receiver (9). This upper part of the cavity is insulated by insulating means (21) designed to reduce heat losses, and the lower part is closed by a transparent cover (23). The transparent cover (23) is designed to reduce heat losses (primarily convective losses). On the lower part of the material, a secondary reflective surface (22) is placed which is designed to redirect towards the tubular receiver (9) those reflected rays that do not hit the front side of the tubular receiver (9) directly. The secondary reflective surface (22) may be designed using different geometries. A heat transfer fluid, which absorbs and transports the concentrated solar energy, taking it to the point of consumption, is made to pass through the tubular receiver (9).

The correct positioning of the linear receiver (18) is achieved by means of end supports (3) which are bound to the structure of the container (1) by means of joints (8). When the system is in transport/storage position, as shown in FIG. 2, the end supports (3) place the linear receiver (18) inside the internal volume of the structure of the container (1), leaving sufficient space for the foldable lateral platforms (2) to be placed in the vertical position. When the system is in operating position, as in FIG. 1, the end supports (3) pivot by means of joints (8), until the linear receiver (18) is placed in the operating position.

In order to support the loads on the linear receiver (18), when necessary, at least some intermediate support system (5) is used. In a preferred embodiment, these intermediate supports may be metallic structures anchored to the base of the structure of the container (1) and to the external casing of the linear receiver ( ), although the intermediate supports may also consist of other gripping systems, such as, for example, metal straps.

The automatic cleaning system comprises movement rails (12) along which central stiffeners (16) travel. At least one cleaning unit (15) for each row of mirrors (6) is joined to these central stiffeners (16) by means of an axis (25), at the height of the rows of mirrors (6). In turn, the cleaning units (15) comprise an element manufactured with absorbent materials (13), an upper cover (14) designed to prevent dirt from depositing on this absorbent element, and a water supply system.

The lower side of the absorbent material (13) of the cleaning units (15) is located at the same height as the rows of mirrors (6), in a position parallel to the plane of the rows of mirrors (6), when these are in an angular position called "cleaning position". The relative position between the cleaning units (15) and the mirrors (17) allows for movement of the cleaning units (15) in the longitudinal direction, as represented by arrows A in FIG. 3.

During this movement, the absorbent material (13) cleans the surfaces of the mirrors (17), using the clean water provided by the water supply system of the cleaning unit (15).

The movement of the cleaning units (15) along the rows of mirrors (6) takes place jointly with that of the central stiffeners (16) along the movement rails (12), thanks to an axis (25) that joins the central stiffeners (16) to the cleaning units (15). The movement of the central stiffeners (16) is achieved by means of direct motorisation or cable pulling.

During normal operation of the system, the automatic cleaning system (10) is placed at the "resting area". This resting area is located at the end of the row of mirrors (6), on the exterior of the surface of mirrors. Consequently, when the automatic cleaning system (10) is in this area, the rows of mirrors (6) may rotate freely, without the risk of being blocked by the cleaning units (15). When the cleaning order is given, the rows of mirrors (6) are placed in the angular cleaning position and, once they are there, the central stiffeners (16) move along the rail (12), pulling the cleaning units (15) and cleaning the surface of the mirrors (17) as they move. During this movement, the water supply system supplies dean water to the cleaning unit (15).

The processes required for the cleaning: The angular positioning of the rows of mirrors (6) in "cleaning position" and the movement of the central stiffeners (16) from the resting area along the entire row of mirrors (6), are completely automated. Therefore, the cleaning of the surface of the mirrors (17) is performed automatically, and may be programmed for those times of the day when there is no production.

Figure 4:
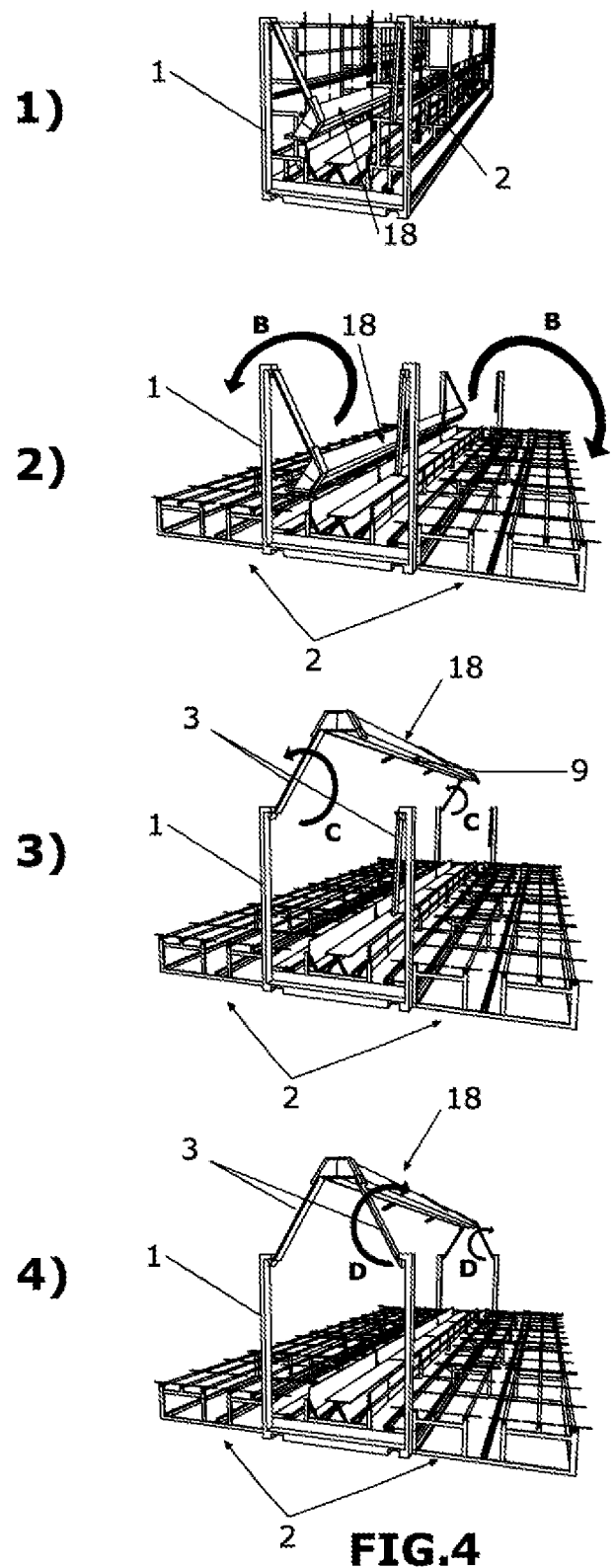
FIG. 4.—Shows a sequence of movements which represents the embodiment of FIGS. 1 and 2, from the transport/storage position until it is fully deployed.
Figure 5:
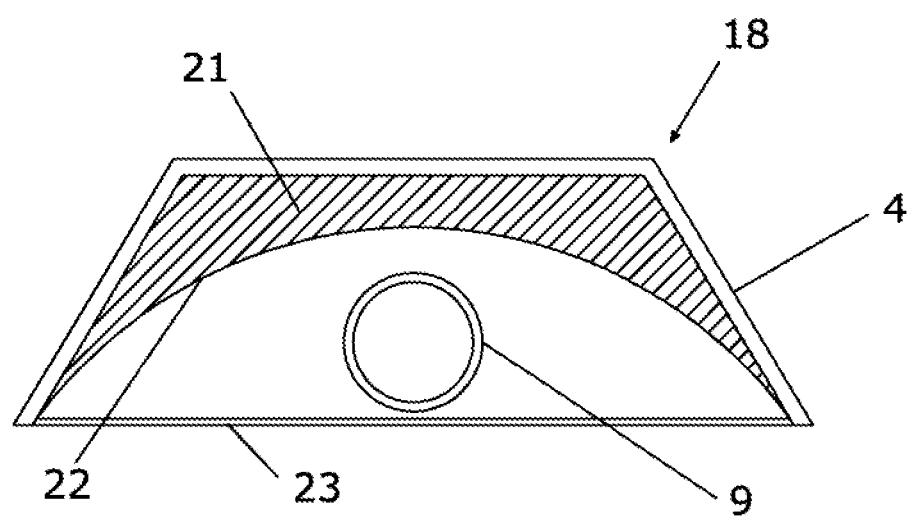
FIG. 5.—Shows a cross-section of the linear receiver with the components of the receiver.

FIG. 4 represents the system deployment sequence from the transport/storage position to the operating position. In the transport/storage position represented in both Diagram 1 of FIG. 4 and in FIG. 2, the system remains contained inside the volume defined by the structure of the container (1). Thus, the terminals of the container remain free, and they may house another container on the upper part thereof or be loaded in conventional goods transport means. In this position, the walls of the container may be covered with a material (textile, metallic or other) in order to protect the elements. When long-term storage is envisaged, the walls of the container may be covered to prevent deterioration of the elements, as well as to prevent thefts.

In the transport/storage position, the foldable lateral platforms (2) remain in the vertical position and the linear receiver (18) remains contained Inside the container thanks to the fact that the end supports of the linear receiver (18) are folded. Moreover, in this position, the ballast tanks (11) are empty. In this position, the mirror-carrying banks (7) are mounted on the lateral platforms (2), but the mirrors (17) may or may not be mounted on the banks. In the embodiment shown in FIG. 2, the mirrors (17) on the lateral platforms (2) have been dismounted in order to prevent breakages during the transport thereof.

When the system is deployed from the transport/storage position, the first step is to fold the lateral platforms (2). The rotation is performed by means of a joint (24) anchored to the base of the container (1). This movement is represented in Diagram 2 of FIG. 4 by the letter B. The movement is preferably performed using a lightweight auxiliary device (pulley system, small crane, lifting platform, etc.) not represented in FIG. 4.

Once the lateral platforms (2) have been deployed, the ballast tanks (11) are filled and, using the same lightweight auxiliary device, the linear receiver (18) is placed in the operating position. This movement is achieved by pivoting the end supports connected to the receiver (3) by means of joints (8) anchored to the support structure of container (1). This movement is represented by the letter C in Diagram 3 of FIG. 4.

Subsequently, the position of the linear receiver (18) is secured by means of the free end supports (3). This movement is indicated by the letter D in Diagram 4 of FIG. 4. Once support of the linear receiver (18) is secured by means of the end supports (3), the intermediate supports (5) must be connected, if necessary. When the linear receiver (18) is in the operating position and the stability thereof has been secured with the supports, the lightweight auxiliary device is removed.

Finally, the mirrors (17) that were not previously mounted are placed on the mirror-carrying banks (7).

Figure 6:
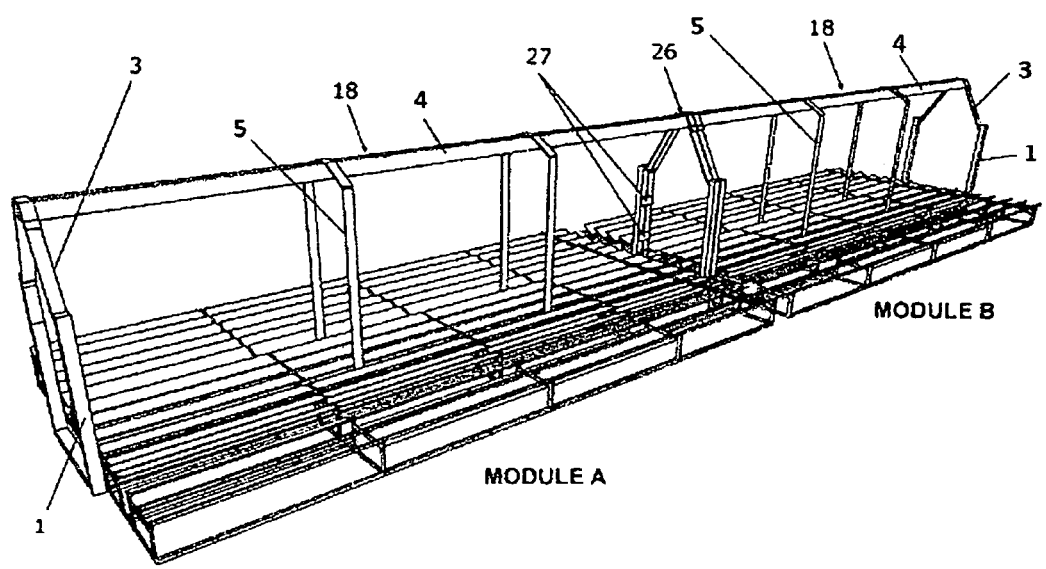
FIG. 6.—Shows the connection of two modules of the embodiment of FIGS. 1 and 2, when the project requires using two or more modules.

When the project is a large-size project, it is necessary to connect several systems in series. The maximum length of the system is defined by the length of the structure of the container (1). Standard commercial containers have two sizes, 12 and 24 feet, such that, when the size of the project requires a larger surface area, as many containers as necessary must be connected in series. The minimum system unit, called "module", is a container. FIG. 6 shows the connecting of two modules.

Connection of the modules is performed by connecting the linear receivers (8) of each module by means of a cylindrical connector part (26) that is welded or screwed onto the external casing (4) of each module. In order to prevent alignment and structural instability problems, the structure of the containers (1) of each module is connected by means of metal joints (27) that are screwed or welded.

Once the mechanical connections have been made, the electrical, data and hydraulic connection of the modules is performed by means of conventional elements.

The invention claimed is:

1. A linear fresnel solar power system which is transportable in a goods container, wherein the solar power system comprises:
   a number of rows of reflective mirrors,
   a support structure, comprising a base for assembling the support structure on a commercial goods container, the container defining a volume,
   the support structure further comprising:
   two foldable lateral platforms articulated to the base of the support structure; and
   two mirror-carrying banks, supported by the lateral platforms, wherein the rows of reflective mirrors are mounted on the mirror-carrying banks, and
   a linear receiver which, in turn, comprises:
   an external casing; and
   end supports articulated on the support structure for supporting loads for the linear receiver and allowing for positioning the linear receiver in a correct operating position.

2. The solar power system of claim 1, further comprising an articulated system for placing the platforms on the support structure in a fixed transport/storage position and a fixed operating/deployment position, wherein:
   in the transport storage position, the platforms are placed vertically with respect to the base of the support structure, wherein the platforms remain inside the volume of the container, thereby allowing for the container to be transported and/or stored using conventional means, and
   in the operating/deployment position, the platforms are placed horizontally with respect to the base of the support structure, wherein the platforms adopt a configuration that allows operation as a linear fresnel solar collector.

3. The solar power system of claim 1, further comprising at least two ballast tanks, one on each platform, for acting as excess weight in order to reduce foundations.

4. The solar power system of claim 1, further comprising an automatic cleaning system which, in turn, comprises:
   movement rails in parallel located between rows of mirrors and under them;
   central stiffeners moving along the movement rails influenced by direct motorisation or cable pulling;
   at least one cleaning unit for each row of mirrors, the at least one cleaning unit comprising:
   an absorbent element manufactured with absorbent materials, for cleaning the mirrors by contact;
   an upper cover for preventing dirt from being deposited on the absorbent element, and
   a water supply system; and
   an axis, at the height of the rows of mirrors, for joining the at least one cleaning unit to the central stiffeners.

5. The solar power system of claim 2, further comprising:
an external casing:
end supports articulated on the support structure for supporting loads for the linear receiver and allowing for positioning the linear receiver in a correct operating position; and
a joint anchored to the support structure, for making the end supports tilt, such that, in transport/storage position, the end supports tilt towards the interior and the linear receiver remains inside the volume of the container, thereby allowing for the container to be transported and/or stored using conventional means; whereas in the operating position, the end supports tilt towards the exterior and position the linear receiver in operating position.

6. A solar power system assembly comprising a plurality of the solar power systems of claim 5, connected to each other in series.

7. The solar power system assembly of claim 6, further comprising:
cylindrical connector parts for connecting the linear receivers of each module by means of a cylindrical connector part that is welded or screwed onto the casing of each solar power system; and
welded or screwed metal joints connecting the support structures of the solar power system to each other for prevent alignment and structural instability problems.

8. The solar power system of claim 5, further comprising at least one intermediate support for supporting loads on the linear receiver.

9. The solar power system of claim 8, wherein the at least one intermediate support is anchored to the base of the support structure and to the casing of the receiver.

* * * * *